United States Patent

[11] 3,577,634

[72] Inventor Duane R. Secrist
San Jose, Calif.

[21] Appl. No. 834,476
[22] Filed June 18, 1969
[45] Patented May 4, 1971
[73] Assignee International Business Machines Corporation
Armonk, N.Y.

[54] METHOD OF MANUFACTURING A MAGNETIC HEAD ASSEMBLY
6 Claims, 7 Drawing Figs.

[52] U.S. Cl. ........ 29/603, 179/100.26
[51] Int. Cl. ........ H01f 7/06
[50] Field of Search ........ 29/604; 179/100.2 (C); 340/174.1 (F); 346/74 (MC)

[56] References Cited
UNITED STATES PATENTS

| | | | |
|---|---|---|---|
| 3,094,772 | 6/1963 | Duinker ........ | 29/603 |
| 3,177,495 | 4/1965 | Felts ........ | 346/74MC |

*Primary Examiner*—John F. Campbell
*Assistant Examiner*—Carl E. Hall
*Attorneys*—Hanifin and Jancin and Nathan N. Kallman

ABSTRACT: A magnetic head slider assembly, used in disc storage files for air bearing noncontact recording is formed from three parts that enclose a glass-bonded ferrite core. During manufacture, a high temperature glass is used to form the nonmagnetic gap in the core, and a low temperature glass is disposed adjacent to the gap glass between the pole pieces of the core. When the core is positioned within a cavity of the slider, the core containing both glasses is heated sufficiently to cause only the low temperature glass to flow and fill the cavity, thereby bonding the core to an inner wall of the cavity within the slider assembly.

PATENTED MAY 4 1971 3,577,634

*INVENTOR.*
DUANE R. SECRIST

*BY* Nathan N. Kallman
ATTORNEY

METHOD OF MANUFACTURING A MAGNETIC HEAD ASSEMBLY

BACKGROUND OF THE INVENTION

1. Field of the Invention

This invention relates to a novel and improved magnetic head assembly, and in particular to a gliding head slider structure wherein a glass gap transducer is bonded to the slider by a glass material.

2. Description of the Prior Art

Gliding head assemblies are commonly employed for transducing action with rotary discs in magnetic disc storage files. One example of such head assembly is disclosed in copending U.S. Pat. application Ser. No. 750,227, filed Aug. 5, 1968, assigned to the same assignee. In the head assembly described in that application, a thin magnetic core in which a nonmagnetic gap is formed, is positioned within a cavity of an air bearing slider assembly. The process of positioning and bonding of the core to a wall in the cavity is further disclosed in copending U.S. Pat. application Ser. No. 794,332, filed Jan. 27, 1969, also assigned to the same assignee. The bonding process is accomplished by first positioning the transducer core in the cavity or slot, and then filling the slot with a fluid glass. However, to introduce glass from an external supply into a relatively narrow, small slot is cumbersome, and the amount of glass that flows into the cavity is difficult to control. Also, it is necessary to obtain good wetting and to achieve a complete, uniform bond between the glass and slider structure without formation of bubbles.

SUMMARY OF THE INVENTION

An object of this invention is to provide an improved method and means for assembly of a multipart magnetic head.

Another object is to provide a novel and improved head assembly wherein the transducer core is firmly bonded to an inner wall of a supporting structure.

In accordance with a particular embodiment of this invention, a magnetic head assembly is formed by joining two magnetic blocks, made of ferrite for example, with a controlled amount of high temperature glass to define a nonmagnetic gap; and subsequently bonding a low temperature glass within a channel between the joined blocks. The assembly is sliced and processed to produce individual transducers, each containing the high temperature glass in the transducing gap, and the low temperature glass disposed between the ferrite pole pieces and spaced from the gap. The transducer is then precisely positioned adjacent to a supporting wall within a multipart housing, which is made from a nonmagnetic ceramic. This assembly is heated to a temperature that allows only the low temperature glass to flow and form a bond between the transducer and the supporting wall of the housing. The high temperature gap glass remains rigid during this latter bonding process. In this manner, a uniform, continuous strong bond is achieved.

BRIEF DESCRIPTION OF THE DRAWINGS

The invention will be described with reference to the drawing in which.

DESCRIPTION OF THE PREFERRED EMBODIMENT

Figure 1:
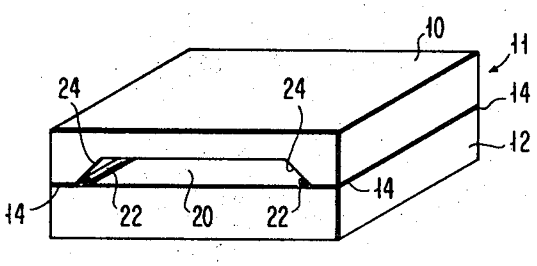
FIG. 1 is an isometric view of a sandwich of ferrite blocks, including high temperature glass rods for forming the nonmagnetic gap in a transducer.
Figure 2:
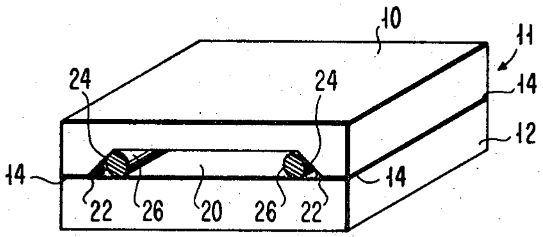
FIG. 2 is an isometric view of the same assembly of FIG. 1, further depicting the low temperature glass rods used for bonding the transducer to a slider assembly.
Figure 3:
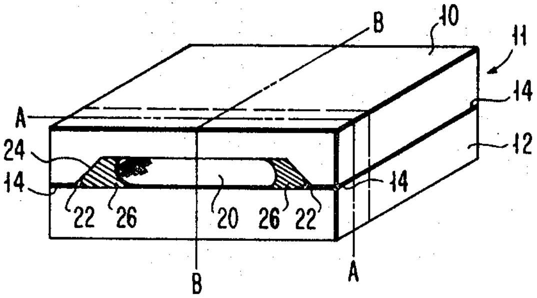
FIG. 3 is an isometric view of the ferrite blocks, with the low temperature bonding glass joined to the structure.

The novel process of this invention is accomplished by positioning two processed ferrite blocks 10 and 12 together to form a sandwich assembly 11, as illustrate in FIG. 1. The blocks, which have been polished and profiled, are separated by spacer shims 14, which determine the length of a nonmagnetic gap 16 in the finished transducer core 18 (see FIG. 4). One block 10 is grooved so that a channel 20 is formed between the two blocks 10 and 12, when assembled. In this channel 20, two glass rods 22 made of high temperature material such as IBM glass 391 or Corning 0211, are inserted within the tapered portions 24 of the channel. The assembly 11 is heated to a temperature, 980° C. after weighting in a furnace for example, and the glass 22 flows by capillary action into the separation provided by the spacers 14.

In accordance with this invention, low temperature glass fibers 26 made of glass material such as IBM 211 or Corning 7570 are placed within the channel 20 adjacent to the high temperature glass used for bonding the ferrite blocks 10 and 12 and for forming the nonmagnetic gap. The block assembly 11 is then reheated at a low temperature, such as 650° C., sufficient to flow the low temperature glass. The glass 26 flows and is joined to the ferrite and glass 22 upon cooling and solidification.

Figure 4:
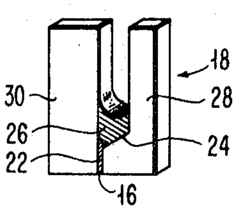
FIG. 4 is an elevational view of an individual transducer formed after bisecting and slicing the ferrite block assembly.
Figure 5:
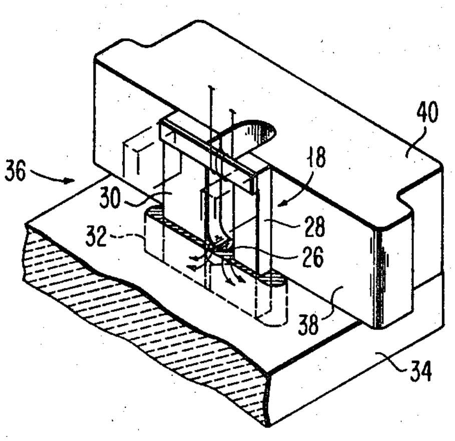
FIG. 5 is a pictorial representation, partly broken away, of a housing with the transducer core positioned in a slot against the inner wall.
Figure 6:
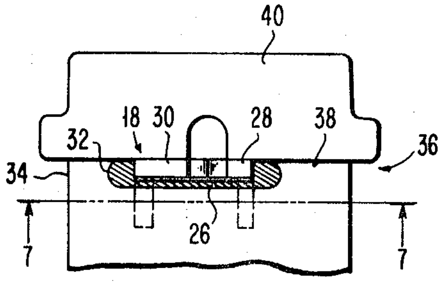
FIG. 6 is a top view of the transducer, as positioned against the wall of the housing.
Figure 7:
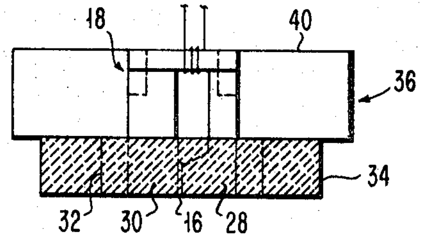
FIG. 7 is a sectional view of a multipart slider assembly incorporating the structure of the instant invention.

The assembly 11 is bisected along lines B–B and sliced along lines A–A to provide individual transducers 18, as illustrated in FIG. 4. The transducer 18, with both glasses 22 and 26 between the pole pieces 28 and 30, is positioned within a slot 32 formed in an air bearing face part 34 of a multisection slider assembly 36. The slider assembly 36 is formed from three ceramic parts as described in the aforementioned U.S. Pat. application Ser. No. 794,322. The transducer is tipped at a slight angle against the supporting wall 38 of the slider bridge part 40, and the face of the transducing gap 16 is in close alignment with the air bearing surface of the face part 34 that traverses the magnetic medium during recording or playback. In such position, the transducer core 18 is heated to a temperature, 650° C. for example, so that only the low temperature glass flows between the pole pieces or legs 28, 30 and into all portions of the slot 32 within the face part 34, thereby uniformly bonding the transducer to the slider assembly 36. The glass 26 preferentially wets the pole pieces or legs 28 and 30 and fills the slot 32 as a result of the differing surface energies by a process of gravity flow. The rate of flow of the low temperature glass can be varied with time and temperature control. Heating may be accomplished by infrared application or in a heat furnace. With infrared heating, the ferrite can be selectively heated if the sealing glass is noninfrared absorbing, so that the glass flow is confined to the area between the ferrite legs 28 and 30. It should be noted that during this step of bonding the transducer to the slider, the high temperature glass 22 in the gap 16 is virtually unaffected.

The head slider assembly is further assembled as set forth in the previously referenced copending applications. By means of this invention, each transducer 18 carries its own supply of bonding glass that is used when the transducer is being assembled to a slider housing. The amount of low temperature glass employed for bonding is easily controlled by selecting a suitable diameter of the glass fibers 26. In this way, problems previously encountered with an external glass supply, such as excess glass, poor wetting and the like, are minimized.

While the invention has been particularly shown and described with reference to a preferred embodiment thereof, it will be understood by those skilled in the art that various changes in the form and details may be made therein without departing from the spirit and scope of the invention.

I claim:

1. A method of manufacturing a magnetic head assembly comprising the steps of:

joining two blocks of magnetic material with a high temperature glass to define a nonmagnetic gap, said blocks having a channel therebetween;

joining a low temperature glass to said blocks within said channel;

dividing said joined blocks to form transducer elements including the nonmagnetic gap with high temperature glass, and with low temperature glass disposed between opposing legs of each transducer element;

assembling the transducer element to a wall of a housing by supporting said element in proximity with said housing and heating the low temperature glass, thereby causing same to flow and form a bond between the transducer and the housing.

2. A method as in claim 1, including the step of positioning said transducer element in a slot formed in said housing prior to bonding of said transducer to said housing.

3. A method as in claim 2, wherein said positioning step further includes the step of tilting said transducer element towards the housing wall.

4. A method as in claim 1, including the step of placing spacer shims between said two blocks to establish the gap length before joining said blocks.

5. A method as in claim 4, wherein said high temperature glass moves into the gap region, established by said spacer shims, by capillary action.

6. A method as in claim 1, wherein said heating for the low temperature sealing process is achieved by application of infrared radiation in which the ferrite legs of said transducer element are selectively heated when relatively noninfrared absorbing sealing glasses are employed.